US008856337B2

(12) United States Patent
Otani

(10) Patent No.: US 8,856,337 B2
(45) Date of Patent: Oct. 7, 2014

(54) METHOD AND APPARATUS OF CLUSTER SYSTEM PROVISIONING FOR VIRTUAL MACHING ENVIRONMENT

(75) Inventor: Toshio Otani, Bellevue, WA (US)

(73) Assignee: Hitachi, Ltd., Tokyo (JP)

( * ) Notice: Subject to any disclaimer, the term of this patent is extended or adjusted under 35 U.S.C. 154(b) by 40 days.

(21) Appl. No.: 13/211,252

(22) Filed: Aug. 16, 2011

(65) Prior Publication Data

US 2013/0046892 A1 Feb. 21, 2013

(51) Int. Cl.
| G06F 15/173 | (2006.01) |
| G06F 15/17 | (2006.01) |
| H04L 12/715 | (2013.01) |
| G06F 3/06 | (2006.01) |
| G06F 9/455 | (2006.01) |
| H04L 29/06 | (2006.01) |
| H04L 29/08 | (2006.01) |
| G06F 11/20 | (2006.01) |

(52) U.S. Cl.
CPC .............. *G06F 15/173* (2013.01); *G06F 15/17* (2013.01); *H04L 45/46* (2013.01); *G06F 3/06* (2013.01); *G06F 9/455* (2013.01); *H04L 29/06* (2013.01); *H04L 67/1095* (2013.01); *G06F 3/0605* (2013.01); *G06F 3/0632* (2013.01); *G06F 3/0637* (2013.01); *G06F 3/067* (2013.01); *G06F 11/20* (2013.01)
USPC ........................................................ 709/226

(58) Field of Classification Search
CPC .......... G06F 15/17; G06F 9/455; H04L 45/46
USPC ........................................................ 709/226
See application file for complete search history.

(56) References Cited

U.S. PATENT DOCUMENTS

| 8,600,726 | B1 * | 12/2013 | Varshney et al. ................ 703/26 |
| 2006/0106590 | A1 * | 5/2006 | Tseng et al. ..................... 703/20 |
| 2008/0189468 | A1 * | 8/2008 | Schmidt et al. ................... 711/6 |
| 2008/0240100 | A1 * | 10/2008 | Smith et al. .................... 370/392 |
| 2009/0240846 | A1 * | 9/2009 | Keller, Jr. ....................... 710/19 |
| 2009/0327799 | A1 * | 12/2009 | Yazawa et al. ..................... 714/4 |
| 2010/0011184 | A1 * | 1/2010 | Mimatsu et al. ............. 711/170 |
| 2010/0031258 | A1 * | 2/2010 | Takano et al. ..................... 718/1 |
| 2010/0161560 | A1 * | 6/2010 | Fujibayashi ................... 707/655 |
| 2010/0169880 | A1 * | 7/2010 | Haviv et al. ........................ 718/1 |

OTHER PUBLICATIONS

"Hyper-V: Using Hyper-V and Failover Clustering", Microsoft Technet http://technet.microsoft.com/en-us/library/cc732181(WS.10).aspx, Jun. 9, 2010, Microsoft.
"ESXi Configuration Guide", http://www.vmware.com/pdf/vsphere4/r40/vsp_40_esxi_server_config.pdf, 2009-2011, pp. 1-196, ESXi 4.0, vCenter Server 4.0, VMware, Inc. Palo Alto, United States of America.

* cited by examiner

*Primary Examiner* — Vivek Srivastava
*Assistant Examiner* — Nicholas Celani

(57) ABSTRACT

A method relates to provisioning a cluster system in a virtual machine environment in a storage system. The storage system has a plurality of hosts, a fabric network, a storage array, and a management server. The method includes inputting information on a first cluster system to be defined, the information including selecting a scale unit wherein the first cluster system is to be defined. An inventory database including resource information for the scale unit selected is provided. A virtual I/O ("vIO") information is provided. The vIO information assigns each of hosts selected for the first cluster system with a vIO device, at least one virtual computer network address, and at least one virtual storage network address. A first cluster definition for the first cluster system in the selected scale unit is created using the vIO information.

17 Claims, 23 Drawing Sheets

| Logical Network Name | VLAN ID |
|---|---|
| MGMT | 10 |
| CLUSTER | 11 |
| MIGRATION | 12 |
| DMZ01 | 101 |
| DMZ02 | 102 |
| DMZ03 | 103 |
| DMZ04 | 104 |
| Int-LAN01 | 105 |
| Int-LAN02 | 106 |
| Int-LAN03 | 107 |
| Int-LAN04 | 108 |

*FIG. 9*

| Array ID | Port ID | Volume ID | Capacity | Pool |
|---|---|---|---|---|
| Array300 | 10-00-00-ab-12-34-56 | 0001 | 500GB | RAID Group #1 |
| Array300 | 10-00-00-ab-12-34-56 | 0002 | 500GB | RAID Group #1 |
| Array300 | 10-00-00-ab-12-34-56 | 0003 | 500GB | RAID Group #1 |

*FIG. 10*

| VIO ID | Virtual LAN Address (MAC address) | Virtual SAN Address (WWPN) | Status |
|---|---|---|---|
| CLUS-A01 | 12-34-56-78-9a-bc<br>12-34-56-78-ab-bc<br>12-34-56-78-bc-bc | 10-00-00-12-34-56-78 | Host 100-1 |
| CLUS-A02 | 12-34-56-78-9a-bd<br>12-34-56-78-ab-bd<br>12-34-56-78-bc-bd | 10-00-00-12-34-56-79 | Host 100-2 |
| CLUS-A03 | 12-34-56-78-9a-be<br>12-34-56-78-ab-be<br>12-34-56-78-bc-be | 10-00-00-12-34-56-80 | Host 100-4 |
| CLUS-A04 | 12-34-56-78-9a-bf<br>12-34-56-78-ab-bf<br>12-34-56-78-bc-bf | 10-00-00-12-34-56-81 | Host 100-5 |
| CLUS-A05 | 12-34-56-78-9a-c1<br>12-34-56-78-ab-c1<br>12-34-56-78-bc-c1 | 10-00-00-12-34-56-82 | Unused |
| CLUS-A06 | 12-34-56-78-9a-c2<br>12-34-56-78-ab-c2<br>12-34-56-78-bc-c2 | 10-00-00-12-34-56-83 | Unused |
| CLUS-A07 | 12-34-56-78-9a-c3<br>12-34-56-78-ab-c3<br>12-34-56-78-bc-c3 | 10-00-00-12-34-56-84 | Unused |
| CLUS-A08 | 12-34-56-78-9a-c4<br>12-34-56-78-ab-c4<br>12-34-56-78-bc-c4 | 10-00-00-12-34-56-85 | Unused |

*FIG. 11*

```
# port-profile cluster-A: MGMT
switchport trunk allowed vlan id 10 port-profile cluster-A static 12-34-56-78-9a-bc
port-profile cluster-A static 12-34-56-78-9a-bd
# port-profile cluster-A static 12-34-56-78-9a-be
# port-profile cluster-A static 12-34-56-78-9a-bf
# port-profile cluster-A static 12-34-56-78-9a-c1
# port-profile cluster-A static 12-34-56-78-9a-c2
# port-profile cluster-A static 12-34-56-78-9a-c3
# port-profile cluster-A static 12-34-56-78-9a-c4
```

*FIG. 12A*

```
# port-profile cluster-A: CLUSTER
switchport trunk allowed vlan id 11 port-profile cluster-A static 12-34-56-78-ab-bc
port-profile cluster-A static 12-34-56-78-ab-bd
# port-profile cluster-A static 12-34-56-78-ab-be
# port-profile cluster-A static 12-34-56-78-ab-bf
# port-profile cluster-A static 12-34-56-78-ab-c1
# port-profile cluster-A static 12-34-56-78-ab-c2
# port-profile cluster-A static 12-34-56-78-ab-c3
# port-profile cluster-A static 12-34-56-78-ab-c4
```

*FIG. 12B*

```
# port-profile cluster-A: MIGRATION
switchport trunk allowed vlan id 12 port-profile cluster-A static 12-34-56-78-bc-bc
port-profile cluster-A static 12-34-56-78-bc-bd
# port-profile cluster-A static 12-34-56-78-bc-be
# port-profile cluster-A static 12-34-56-78-bc-bf
# port-profile cluster-A static 12-34-56-78-bc-c1
# port-profile cluster-A static 12-34-56-78-bc-c2
# port-profile cluster-A static 12-34-56-78-bc-c3
# port-profile cluster-A static 12-34-56-78-bc-c4
```

FIG. 12C

```
# zone name cluster-A
member pwwn 10-00-00-12-34-56-78
member pwwn 10-00-00-12-34-56-79
member pwwn 10-00-00-12-34-56-80
member pwwn 10-00-00-12-34-56-81
member pwwn 10-00-00-12-34-56-82
member pwwn 10-00-00-12-34-56-83
member pwwn 10-00-00-12-34-56-84
member pwwn 10-00-00-12-34-56-85
member pwwn 10-00-00-ab-12-34-56
```

FIG. 13

| Host Name | Status |
|---|---|
| Host 100-1 | Assigned (cluster-A) |
| Host 100-2 | Assigned (cluster-A) |
| Host 100-3 | Unused |
| Host 100-4 | Assigned (cluster-A) |
| Host 100-5 | Assigned (cluster-A) |
| Host 100-6 | Unused |
| Host 100-7 | Unused |
| Host 100-8 | Assigned (cluster-B) |
| Host 100-9 | Assigned (cluster-B) |
| Host 100-10 | Assigned (cluster-B) |
| Host 100-11 | Unused |

*FIG. 24A*

| Array ID | Volume ID | Status |
|---|---|---|
| Array300 | 0001 | Assigned (cluster-A) |
| Array300 | 0002 | Assigned (cluster-A) |
| Array300 | 0003 | Assigned (cluster-A) |
| Array300 | 0004 | Assigned (cluster-B) |
| Array300 | 0005 | Assigned (cluster-B) |
| Array300 | 0006 | Assigned (cluster-C) |
| Array300 | 0007 | Assigned (cluster-C) |
| Array300 | 0008 | Unused |
| Array300 | 0009 | Unused |
| Array300 | 0010 | Unused |
| Array300 | 0011 | Unused |

*FIG. 24B*

| VLAN ID | Status |
|---|---|
| 2 | Unused |
| 3 | Unused |
| 4 | Unused |
| 5 | Unused |
| 6 | Unused |
| 7 | Unused |
| 8 | Unused |
| 9 | Unused |
| 10 | Assigned (cluster-A) |
| 11 | Assigned (cluster-A) |
| 12 | Assigned (cluster-A) |
| 13 | Unused |
| 14 | Unused |
| 15 | Unused |
| 16 | Unused |
| 17 | Assigned (cluster-B) |
| 18 | Assigned (cluster-B) |
| 19 | Assigned (cluster-B) |
| 20 | Unused |
| ... | ... |

*FIG. 24C*

| VLAN ID | Network Address | IP Address | Status |
|---|---|---|---|
| 2 | 10.1.2.0/24 | 10.1.2.1 | Unused |
| 2 | 10.1.2.0/24 | 10.1.2.2 | Unused |
| 2 | 10.1.2.0/24 | 10.1.2.3 | Unused |
| 2 | 10.1.2.0/24 | 10.1.2.4 | Unused |
| 2 | 10.1.2.0/24 | 10.1.2.5 | Unused |
| ... | ... | ... | ... |
| 10 | 10.1.10.0/24 | 10.1.10.1 | Assigned (12-34-56-78-9a-bc) |
| 10 | 10.1.10.0/24 | 10.1.10.2 | Assigned (12-34-56-78-9a-bd) |
| 10 | 10.1.10.0/24 | 10.1.10.3 | Assigned (12-34-56-78-9a-be) |
| 10 | 10.1.10.0/24 | 10.1.10.4 | Unused |
| 10 | 10.1.10.0/24 | 10.1.10.5 | Unused |
| 10 | 10.1.10.0/24 | 10.1.10.6 | Unused |
| ... | ... | ... | ... |

*FIG. 24D*

| MAC address | Status |
|---|---|
| 12-34-56-78-9a-bc | Assigned (cluster-A) |
| 12-34-56-78-ab-bc | Assigned (cluster-A) |
| 12-34-56-78-bc-bc | Assigned (cluster-A) |
| 12-34-56-78-9a-bd | Assigned (cluster-A) |
| 12-34-56-78-ab-bd | Assigned (cluster-A) |
| 12-34-56-78-bc-bd | Assigned (cluster-A) |
| 12-34-56-78-9a-bd | Assigned (cluster-A) |
| 12-34-56-78-ab-be | Assigned (cluster-A) |
| 12-34-56-78-bc-be | Assigned (cluster-A) |
| 12-34-56-78-9a-be | Assigned (cluster-A) |
| 12-34-56-78-ab-bf | Assigned (cluster-A) |
| 12-34-56-78-bc-bf | Assigned (cluster-A) |
| 12-34-56-78-bc-bf | Assigned (cluster-A) |
| ... | ... |

*FIG. 24E*

| WWPN | Status |
|---|---|
| 10-00-00-12-34-56-78 | Assigned (cluster-A) |
| 10-00-00-12-34-56-79 | Assigned (cluster-A) |
| 10-00-00-12-34-56-80 | Assigned (cluster-A) |
| 10-00-00-12-34-56-81 | Assigned (cluster-A) |
| 10-00-00-12-34-56-82 | Assigned (cluster-A) |
| 10-00-00-12-34-56-83 | Assigned (cluster-A) |
| 10-00-00-12-34-56-84 | Assigned (cluster-A) |
| 10-00-00-12-34-56-85 | Assigned (cluster-A) |
| ... | ... |

*FIG. 24F*

METHOD AND APPARATUS OF CLUSTER SYSTEM PROVISIONING FOR VIRTUAL MACHING ENVIRONMENT

BACKGROUND OF THE INVENTION

The present invention relates to a storage system including cluster systems in a virtual machine environment, more particularly to resource provisioning and management of a cluster system in a virtual machine environment.

Many companies have embraced the virtual machine environment in recent years. Its usage allows physical machines, e.g., servers, to be consolidated into fewer machines and thereby reduce hardware cost. Some estimates that companies often manage more virtual machines than actual physical machines. The number of virtualized physical servers, i.e., physical servers that run virtual machine environment, is expected to increase even more in coming years. The cost of information technology (IT) platform management has been rising with the greater adoption of virtual machine environment since the management of virtual machines tends to be more complicated than physical machines. This is particularly true in a storage system that has numerous components operating together to provide fine-tuned and robust user experience. A storage system typically includes one or more storage arrays, a fabric network including a storage network and a LAN, and a plurality of hosts. One type of commonly used storage network is Storage Area Network (SAN).

A conventional method of managing a cluster in a virtual machine environment in a storage system requires multiple communications among many IT administrators, such as, a server administrator, a network administrator, a virtual machine administrator and a storage administrator. For example, if one or more storage volumes (LU) have to be shared within the physical servers in the same cluster, the server administrator and the network administrator need to exchange system attributes such as which HBA of which machine, which storage ports to use, redundant I/O paths, zoning and so on. The network administrator and the storage administrator need to exchange system attributes for a particular zone, e.g., the storage ports, the LUNs (LU numbers), the WWPNs (World Wide Port Name), and other attributes that are associated with that zone. The server administrator and the storage administrator need to communicate with each other information such as LUN masking, LUNs (LU numbers) and so on. The virtual machine administrator needs to provide information on which VLAN (Virtual LAN) should be used by which virtual machine, which volume should be used by which virtual disk and so on.

The communication between the network administrator and the storage administrator is particularly complicated and time consuming to manage a cluster system in a virtual machine environment. The server or virtual machine administrator, for example, often needs to ask the network administrator to create one or more VLAN on specific ports when a cluster is created, a host is added to a cluster, a host is deleted from a cluster, a host is replaced from a cluster, or the like. Normally, these communications are performed by sending emails or exchanging spreadsheets. Such a "manual" or "non-automated" method adds a significant administrative burden and thus cost.

The server/virtual machine administrator and the storage administrator experience a similar administrative burden. The server or virtual machine administrator, for example, needs to ask the storage administrator to create one or more logical volumes for a specific cluster, on a specific storage array and port. They need the WWPN addresses of an initiator (host) and a target (storage array) in order to configure a zone on specific switches. These procedures are often needed when a cluster is created, a host is added to a cluster, a host is deleted from a cluster, a host is replaced from a cluster, or the like. These communications typically are performed by sending email requests and providing spreadsheets, or the like. Because of this multiple layers of time consuming communication and coordination among various IT administrators, the deployment and management of cluster systems in a virtual machine environment (or "virtual cluster systems") impose high administrative cost and burden on IT administrators.

BRIEF SUMMARY OF THE INVENTION

The present invention relates to provisioning and managing a cluster system in a virtual machine environment in a storage system. In an embodiment, a cluster definition table (also referred to as "cluster definition") having a virtual LAN table, a volume table, virtual I/O table is generated and stored in a system management server in order to simplify provisioning and management of a virtual cluster system. A management module is used in conjunction with a cluster definition table to simplify the virtual cluster system provisioning and management.

In an embodiment, a method for provisioning a cluster system in a virtual machine environment in a storage system is disclosed. The storage system has a plurality of hosts, a fabric network, a storage array, and a management server. The method includes inputting information on a first cluster system to be defined, the information including selecting a scale unit wherein the first cluster system is to be defined; providing an inventory database including resource information for the scale unit selected; providing a virtual I/O ("vIO") table, the vIO table assigning each of hosts selected for the first cluster system with a vIO device, at least one virtual computer network address, and at least one virtual storage network address; and creating a first cluster definition for the first cluster system in the selected scale unit using the vIO table.

In another embodiment, a management server is provided in a storage system having a plurality of hosts, a fabric network, and a storage array. The management server is configured for provisioning of a cluster system in a virtual machine environment of the storage system. The management server comprises a processor configured to process data; a memory configured to store information; a port configured for communication with the storage array via the fabric network; and a cluster management module. The cluster management module is operable to receive information on a first cluster system to be defined, the information including selecting a scale unit wherein the first cluster system is to be defined; operable to access an inventory database including resource information for the scale unit selected; operable to create a virtual I/O ("vIO") information, the vIO information assigning each of hosts selected for the first cluster system with a vIO device, at least one virtual computer network address, and at least one virtual storage network address; and operable to create a first cluster definition for the first cluster system in the selected scale unit using the vIO information.

BRIEF DESCRIPTION OF THE DRAWINGS

FIG. 9 illustrates a VLAN table for a cluster.

FIG. 10 illustrates a volume table for a cluster.

FIG. 11 illustrates a virtual I/O (vIO) table for a cluster.

FIGS. 12a-12c illustrate port profiles for a cluster.

FIG. 13 illustrates a zoning table for a cluster.

FIGS. 24a-24f illustrate a host table, a storage array table, a VLAN ID table, an IP address table, a MAC address table, and WWPN address table.

DETAILED DESCRIPTION OF THE INVENTION

The embodiments relate to cluster systems in a virtual machine environment in a storage system, more particularly to simplifying the provisioning and managing of a cluster in a virtual machine environment. Embodiments simplify the time consuming communication process performed amongst various IT administrators (e.g., between the server/virtual machine administrator and the network administrator, between the server/virtual machine administrator and the storage administrator, or between the network administrator and the storage administrator) to provision a cluster system.

In an embodiment, a management server in a storage system includes a cluster definition table (also referred to as "cluster definition"). The cluster definition includes a virtual LAN table, a volume table, and a virtual I/O device table (or vIO table). The cluster definition is created using an inventory database of a scale unit. The management server also includes a cluster database and a cluster management module.

In an embodiment, an administrator (e.g., server or virtual machine administrator) creates one or more cluster definition tables that are made available to other administrators. A module provides a graphic user interface to enable administrators to access the cluster definition table. The cluster definition tables and the module are stored in a management server in an implementation. A storage administrator may configure a storage array based on the cluster definition tables. A network administrator may configure switches (LAN and SAN) based on the cluster definition tables. A server administrator may select one or more hosts to create a cluster, add a host to a cluster, delete a host from a cluster, or change a host of a cluster according to the cluster definition table.

Figure 1:
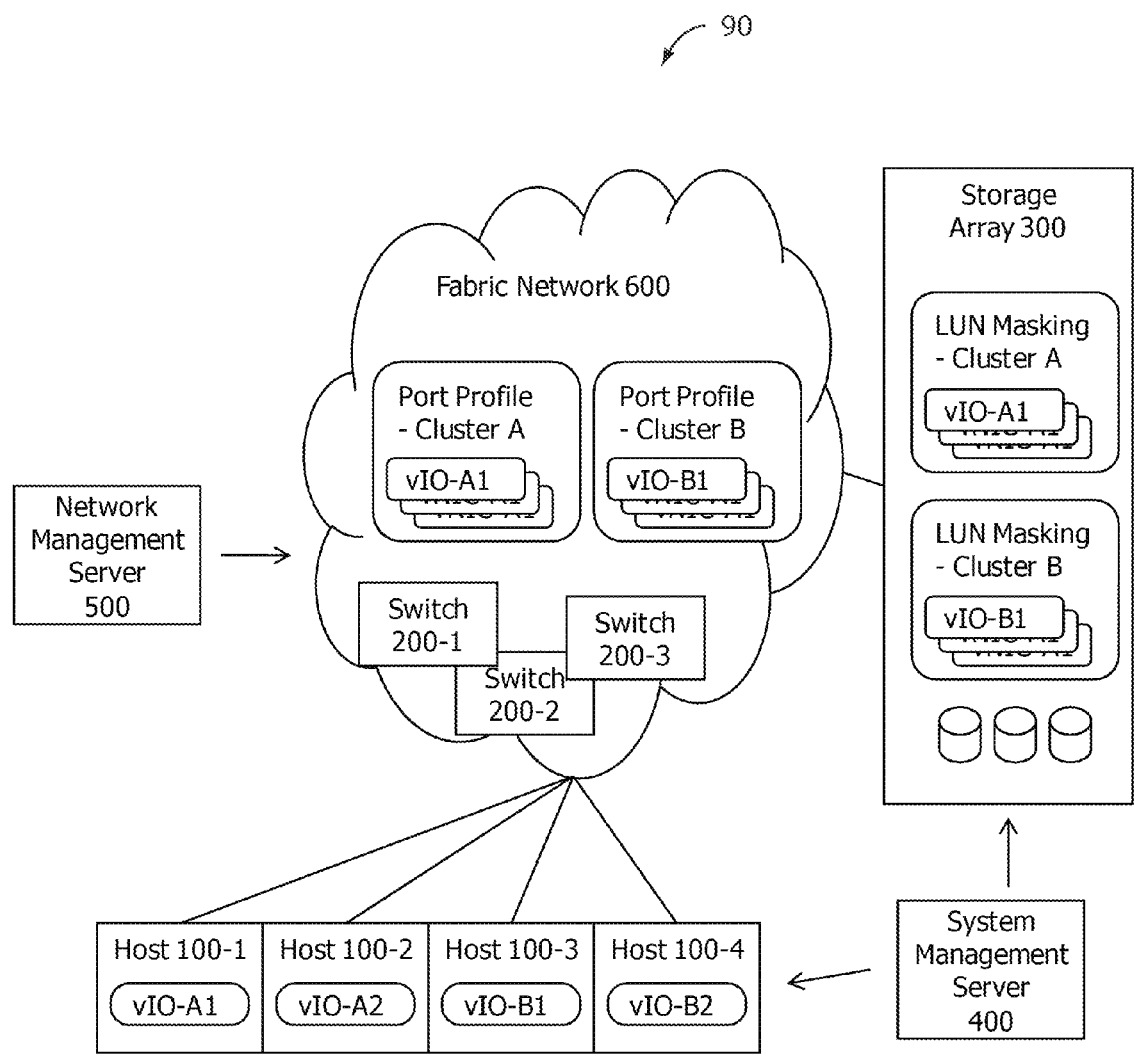
FIG. 1 illustrates a storage system.

FIG. 1 illustrates a storage system 90. Storage system 90 includes a host 100, a switch 200, a storage array 300, a system management server 400 and a network management server 500. As will be understood by those skilled in the art, storage system 90 typically includes of a plurality of hosts 100-1, 100-2, 100-3, and 100-4, and a plurality of fabric switches 200-1, 200-2, and 200-3. For illustrative convenience, however, the host and the switch may be referred to herein in a singular term.

Figure 2:
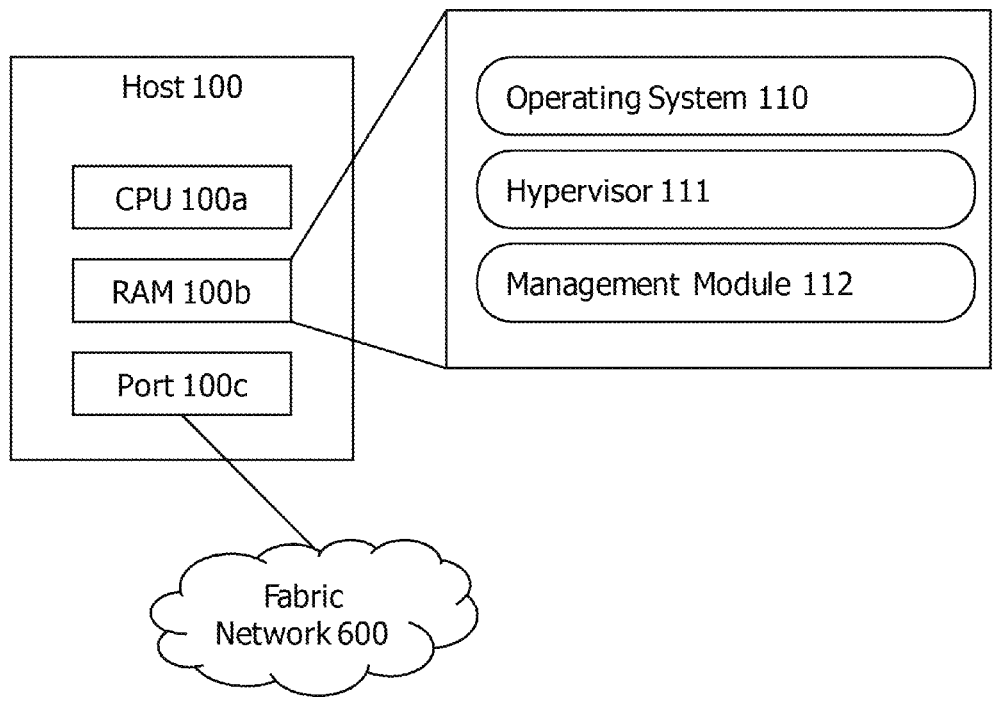
FIG. 2 illustrates a host.

FIG. 2 illustrates host 100. Host 100 is a server through which users can access storage array 300. Host 100 includes a CPU 100a, a memory (e.g., Random Access Memory (RAM)) 100b, and a port 100c. Port 100c is a network interface, e.g., Ethernet or Fibre Channel HBA (Host Bus Adapter), and is connected to fabric network 600. Host 100 communicates with other hosts or storage array 300 via port 100c. Typically host 100 includes an operating system 110, a hypervisor (or virtual machine manager) 111, and a management module 112 to configure components in the host. Hypervisor 111 is a middleware for running a virtual machine environment. As will be understood by one skilled in the art, the modules described herein including management module 112 may be implemented by software or hardware. Each host is assigned a virtual I/O device (or vIO). For example, host 100-1 is assigned vIO-A1, host 100-2 is assigned vIO-A2, host 100-3 is assigned vIO-B1, and host 100-4 is assigned vIO-B2 in storage system 90 of FIG. 1.

Figure 3:
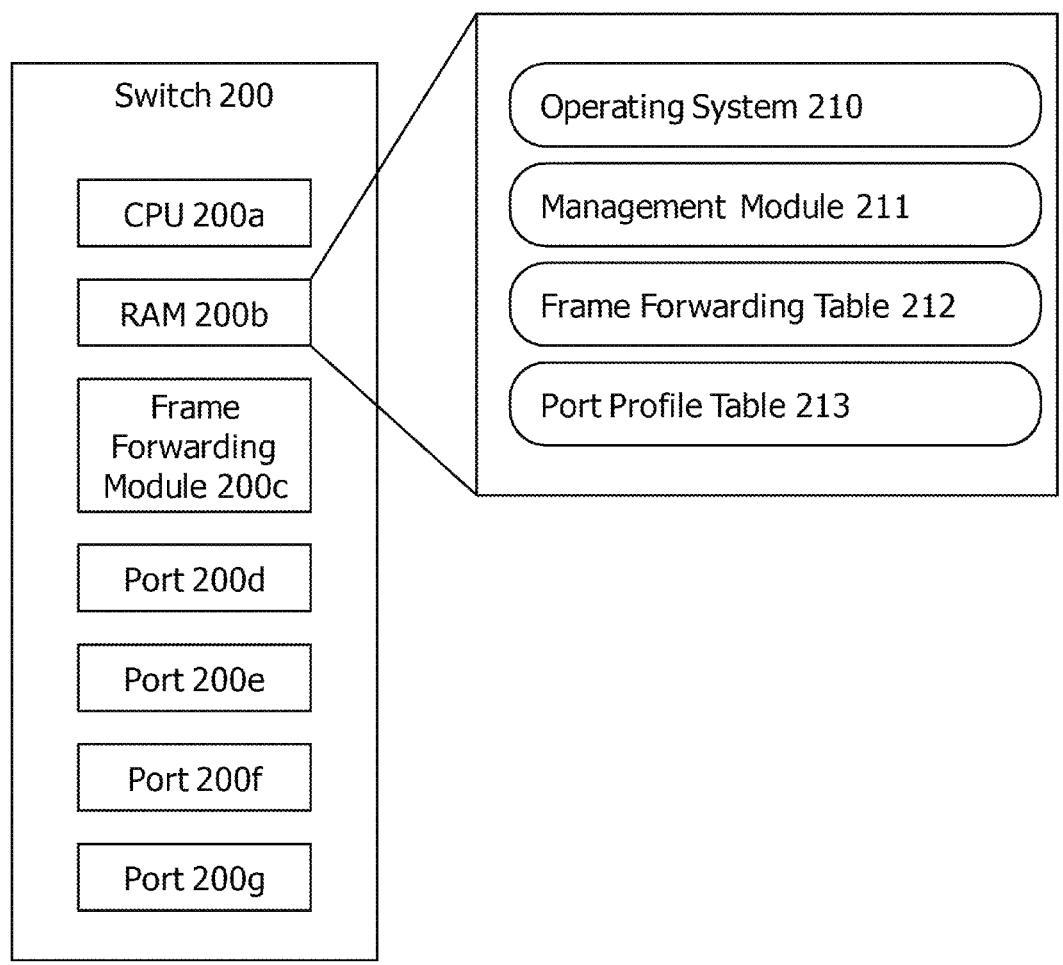
FIG. 3 illustrates a switch.

FIG. 3 illustrates switch 200. Switch 200 is provided as part of a fabric network 600 that provides LAN (Local Area Network) and/or SAN (Storage Area Network) connectivity between host 100 and storage array 300. Fabric network 600 may also comprise ESCON, SCSI, WAN, or combination thereof. Switch 200 includes a CPU 200a, a RAM 200b, a frame forwarding module 200c, and a plurality of ports 200d, 200e, 200f, and 200g. Frame forwarding module 200c sends and receives Ethernet/Fibre Channel frames from/to port 200d, 200e, 200f and 200g. Switch 200 also has an operating system 210, a management module 211 to control certain functions of switch 200, a frame forwarding table 212 that is used by frame forwarding module 200c to determine which frames should be transferred to which ports, and a port profile table 213 for cluster network configuration (as will be discussed later). As will be understood by one skilled in the art, the modules described herein may be implemented by software or hardware.

Figure 4:
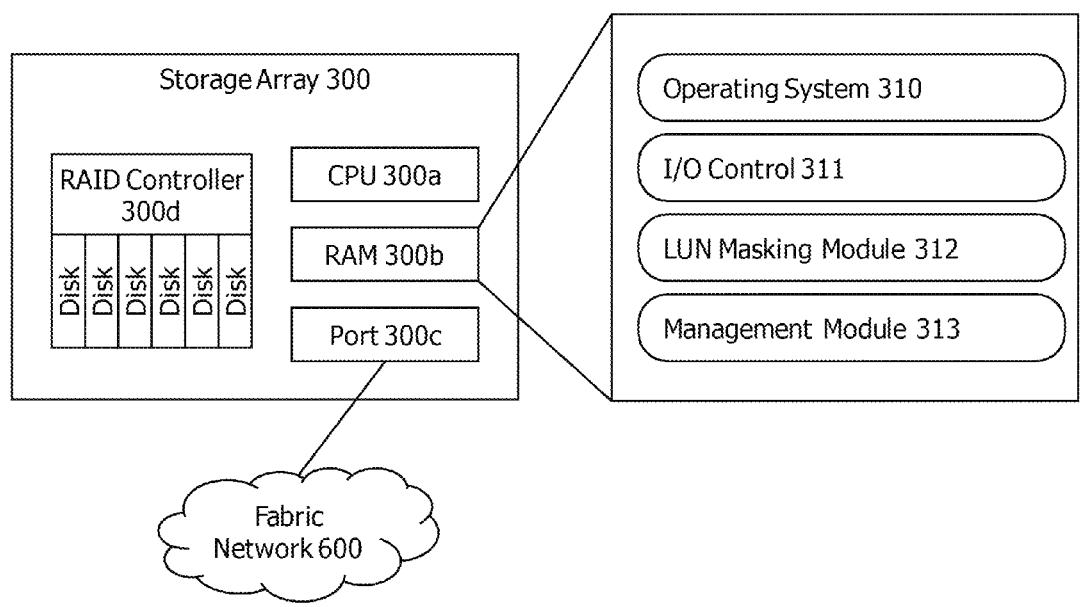
FIG. 4 illustrates a storage array.

FIG. 4 illustrates storage array 300. Storage array 300 may include one or more disk systems that have physical storage disks (or hard disks or optical disks) that are used to provide logical storage volumes. Storage array 300 includes a CPU 300a, a RAM 300b, a port 300c and a RAID (Redundant Array of Independent Disks) controller 300d to provide logical storage volumes. Logical storage volumes or logical units (LUs) are mapped to one or more storage disks managed by the RAID controller.

Storage array 300 also has operating system 310, an I/O controller 311 to handle SCSI read and write commands from/to host 100 by using storage I/O protocol such as Fibre Channel, FCoE (Fibre Channel over Ethernet), iSCSI (Internet SCSI) and so on. A LUN masking module 312 provides LU access control to host 100. LU access control is performed using WWPN address of an access initiating host 100 according to an implementation. A management module 313 provides system management features of storage array 300.

Figure 5:
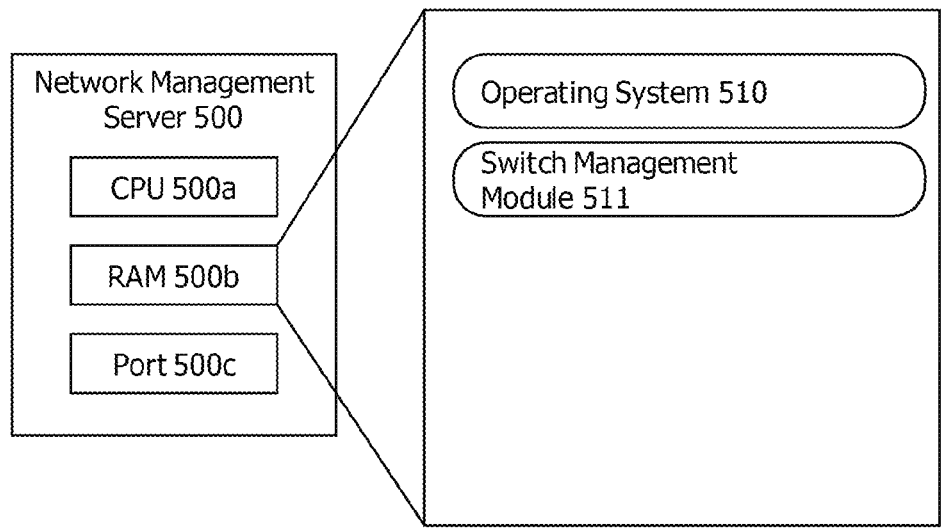
FIG. 5 illustrates a network management server.

FIG. 5 illustrates a network management server 500. Network management server 500 includes a CPU 500a, a RAM 500b, and a port 500c. Network management server 500 also includes an operating system 510 and a switch management module 511 to control switch 200 via management module 211 and port 500c.

Figure 6:
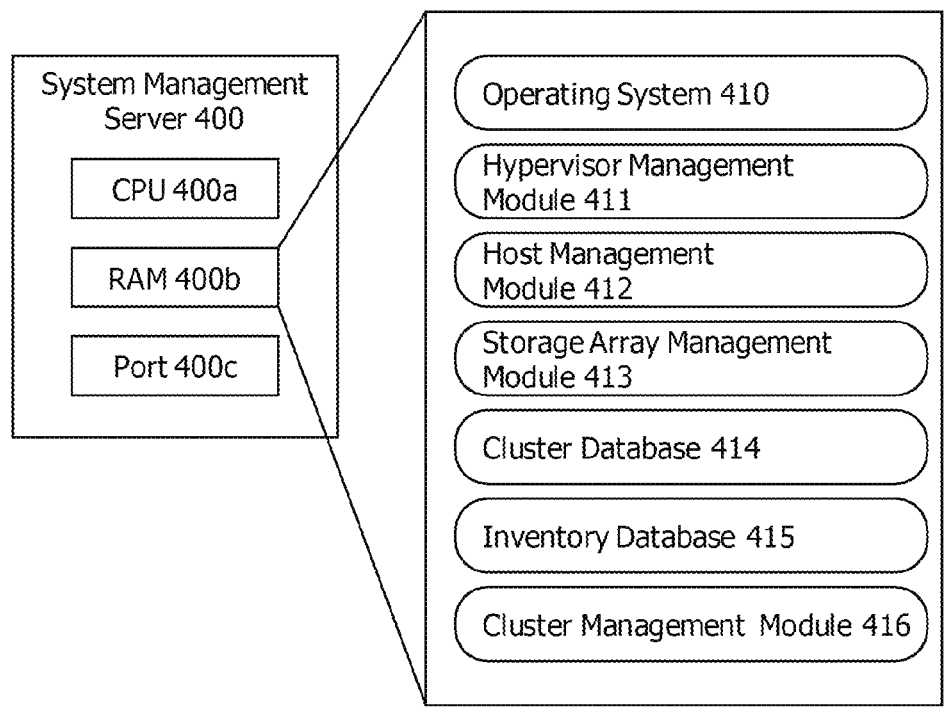
FIG. 6 illustrates a system management server.

FIG. 6 illustrates a system management server 400. System management server 400 manages the storage system including storage array 300 and hosts 100. In an implementation, system management server 400 also manages fabric network 6000 with network management server 500. System manager server 400 includes a CPU 400*a*, a RAM 400*b*, and a port 400*c*.

System manager server 400 also includes an operating system 410, a hypervisor management module 411 to control hypervisor 111 on host 100 via management module 112, a host management module 412 to control host 100 via management module 112 and port 400*c*, and a storage array management module 413 to control storage array 300 via management module 313 and port 400*c*.

In the present embodiment, system manager server 400 is used to simplify the provisioning and managing of a virtual cluster in a storage system. System manager server 400 includes a cluster database 414, an inventory database 415, and a cluster management module 416. In another embodiment, cluster database 414, inventory database 415, and cluster management module 416 are provided in another location, e.g., in network management server 500. In yet another embodiment, cluster database 414, inventory database 415, and cluster management module 416 are distributed in different locations in storage system 90.

Figures 7, 8A:
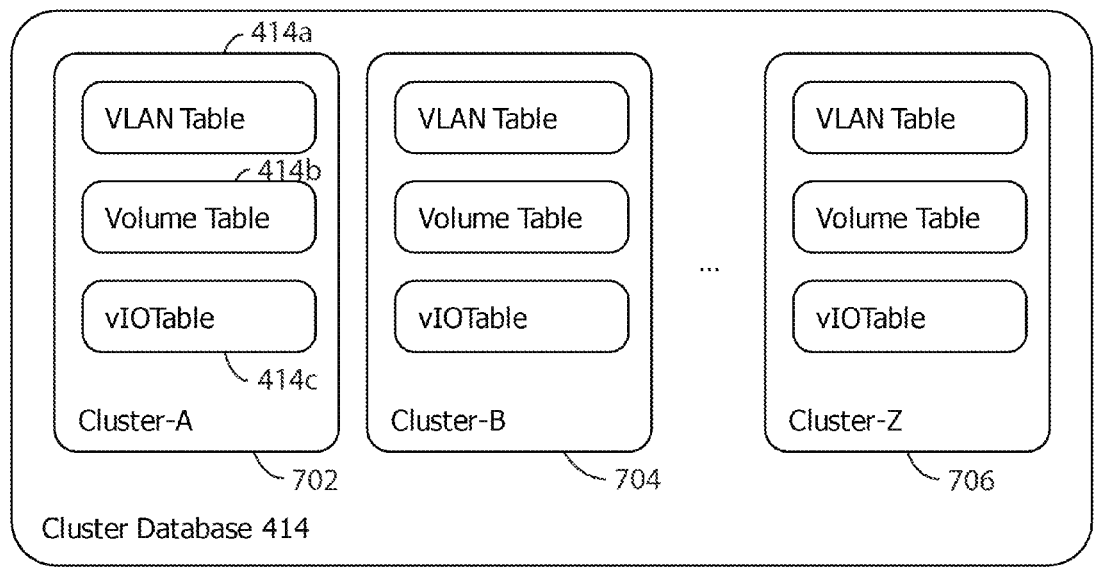
FIG. 7 illustrates a cluster database.
FIGS. 8a and 8b illustrate graphic user interfaces (GUIs) for defining a cluster.

FIG. 7 illustrates cluster database 414. Cluster database 414 includes a plurality of cluster definition tables 702, 704, and 706 (Cluster-A, Cluster-B, etc.) for clusters provided in storage system 90. In the present embodiment, the cluster definition tables for clusters are created by a server or virtual machine administrator and stored in the system management server. A storage administrator may configure a storage array based on the cluster definition tables. A network administrator may configure switches (LAN and SAN) based on the cluster definition tables. A server administrator may select one or more hosts to create a cluster, adds a host to a cluster, delete a host from a cluster, or change a host of a cluster according to the cluster definition table.

Each cluster definition table includes a VLAN table 414*a*, a volume table 414*b* and a vIO (or virtual interface device) table 414*c*. VLAN table 414*a* lists one or more VLAN IDs that will be used by the cluster. Volume table 414*b* lists one or more logical volumes that will be used by the cluster. vIO table 414*c* lists virtual IO devices and hosts that are assigned to each other. Cluster definition table will be described in more detail subsequently using FIGS. 9-14.

FIG. 8*a* illustrates a graphic user interface (GUI) 800 for defining a cluster. In an embodiment, cluster management module 416 of system manager server 400 provides GUI 800. An administrator uses GUI 800 to create cluster definition tables for storage system 90. A scale unit (SKU) is selected using a SKU selector 802. In an embodiment, a plurality of SKUs is predefined from which an administrator can choose a desired SKU. The name of a cluster is input using a cluster input section 804. In an embodiment, GUI 800 may provide one or more predefined cluster names to choose from. The maximum number of hosts and the maximum number of storage array ports for the cluster are input using sections 806 and 808. A storage capacity for the cluster is defined using a section 810. In an embodiment, cluster management module 416 is used to check whether the numbers assigned using sections 806-810 are permissible by checking inventory database 415.

Figure 22:
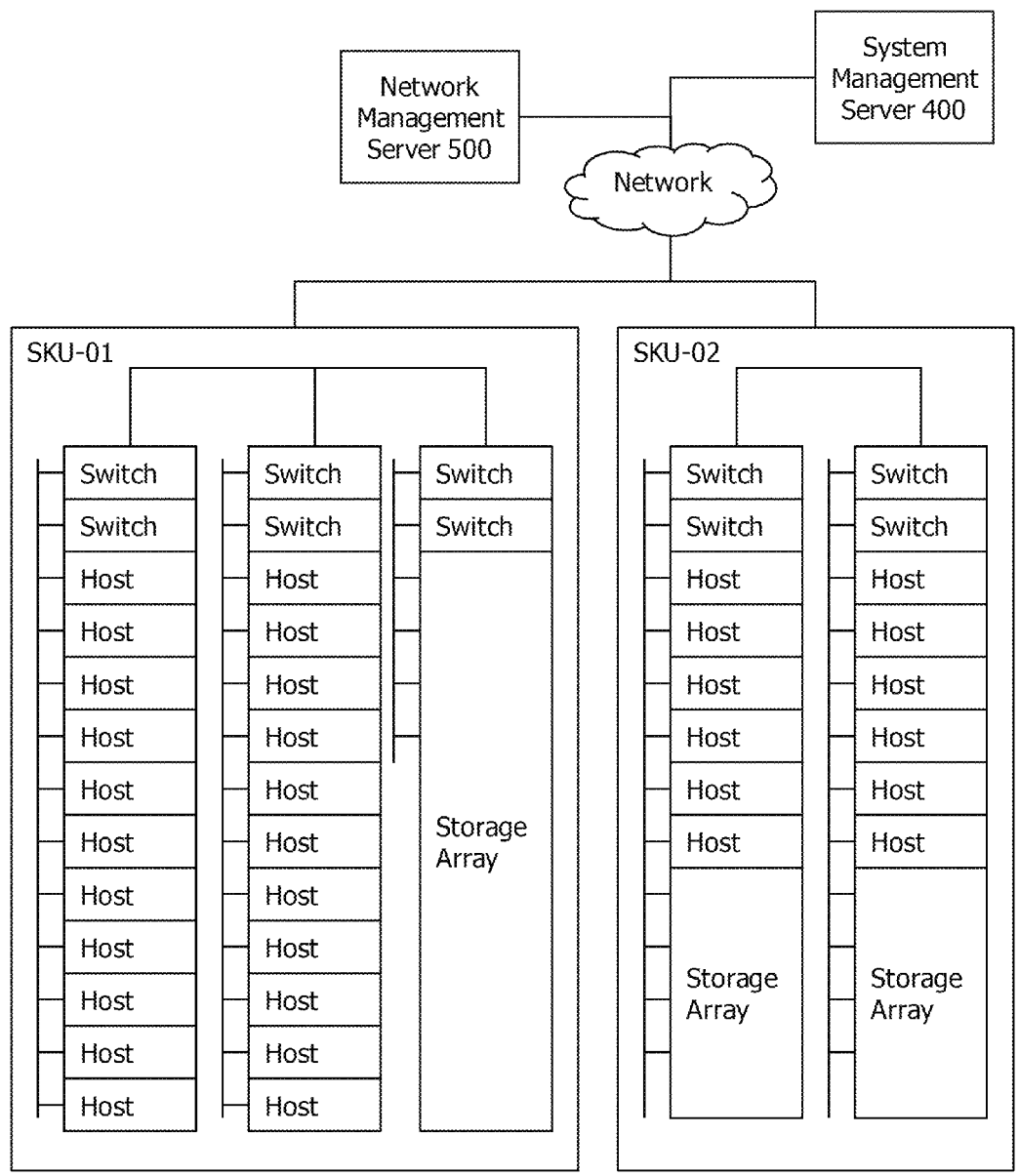
FIG. 22 illustrates exemplary scale unites that are managed by a system management server and a network management server.

A scale unit SKU is a group of components which includes hosts, switches and storage array. FIG. 22 illustrates exemplary SKU-01 and SKU-02 that are managed by system management server 400 and network management server 500. SKU-01 includes a plurality of hosts, a plurality of switches and at least one storage array. SKU-01 may be configured for physical resource dedication such as hosting service, data centers and the like. One or more clusters for a scale unit are defined using components within the scale unit.

Figure 23:
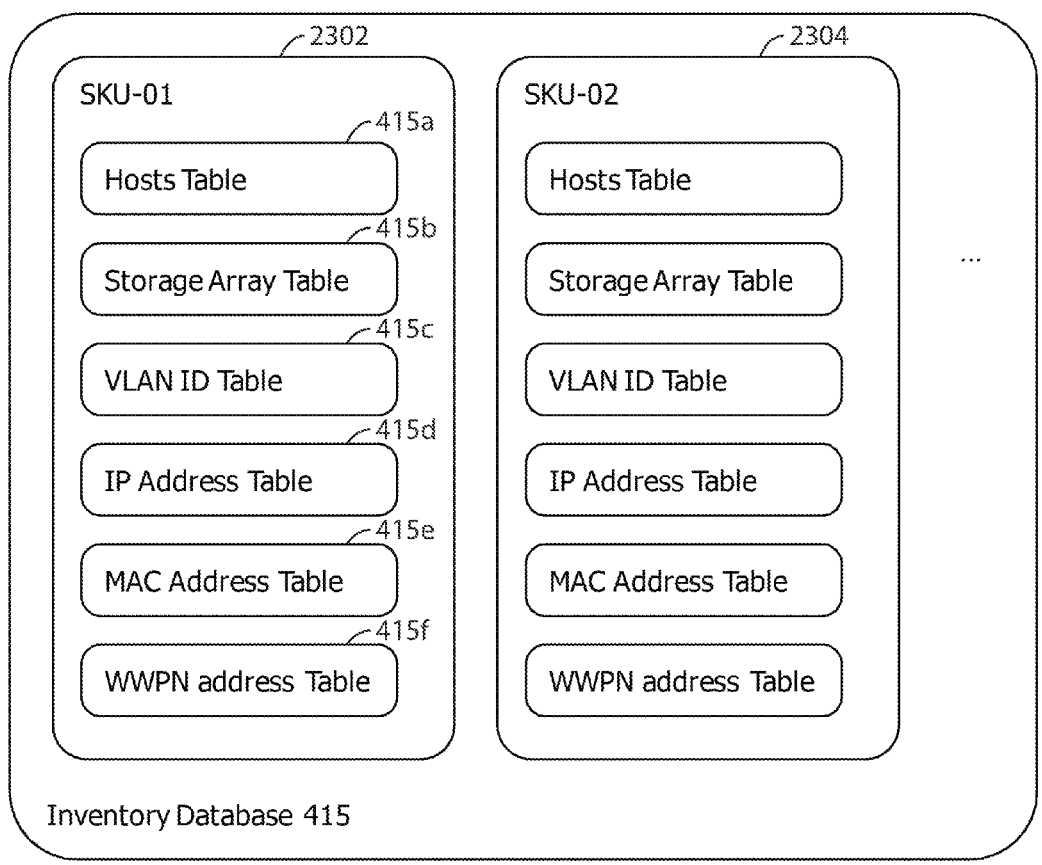
FIG. 23 illustrates an exemplary inventory database that describes a scale unit and components thereof.

FIG. 23 illustrates an exemplary inventory database 415 that describes SKUs, e.g., SKU-01 and SKU-02, and components thereof SKU-01 definition 2302 includes a host table 415*a*, a storage array table 415*b*, and a VLAN ID table 415*c*. These identifiers cannot be duplicated within the same SKU. SKU-01 definition 2302 also includes an IP address table 415*d*, a MAC address table 415*e*, and a WWPN address table 415*f*. SKU-02 definition 2304 similarly includes a host table, a storage array table, a VLAN ID table, an IP address table, a MAC address table, and a WWPN address table.

Host table 415 a lists hosts available for a SKU and their status, i.e., whether or not they have been assigned to a particular cluster (FIG. 24*a*). Storage array table 415*b* lists available storage arrays, storage volumes, and status of each storage volume (FIG. 24*b*). VLAN ID table 415*c* lists VLAN IDs and their status (FIG. 24*c*). Each VLAN may be assigned to a particular cluster. IP address table 415*d* lists VLAN IDs, network addresses, IP addresses, and status of each IP address (FIG. 24*d*). MAC address table 415*e* lists MAC addresses and status of each MAC address (FIG. 24*e*). WWPN address table 415*f* lists WWPN and status of each WWPN (FIG. 24*f*). Using these tables, inventory database 415 defines the resources available for a given scale unit from which cluster definition tables for that scale unit can be generated.

Figure 8B:
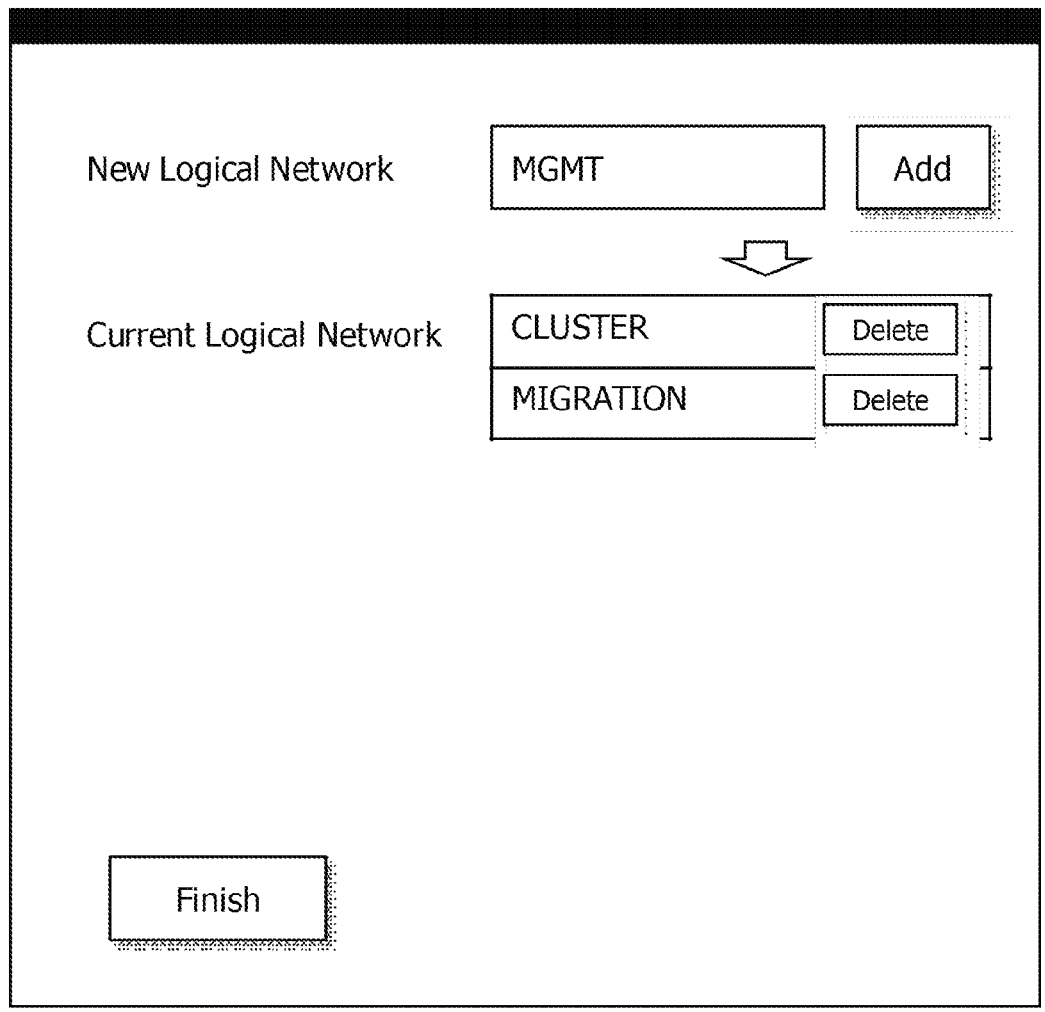

Referring to FIG. 8*b*, a GUI 812 for defining a cluster is provided by cluster management module 416. GUI 812 is used to define logical network (LN), e.g., by server or virtual machine administrator. LN is a virtual component used by hosts in a cluster. For example, a cluster in a virtual machine environment needs several dedicated logical networks for virtual machine migration, cluster management (heart beat) and the like. Each LN is expressed by using VLAN (VLAN ID), and all hosts in the same cluster need to have the same LN. In GUI 812, three LNs are being defined: (1) MGMT for management LAN, (2) CLUSTER for cluster heartbeat, and (3) MIGRATION for virtual machine migration. In an embodiment, the cluster definition step using GUI 812 may be automated, e.g., cluster management module 416 may predefine how many and types of LNs required for the cluster).

After server or virtual machine administrator inputs required information to define a cluster via GUI of FIG. 8, cluster management module 416 creates attributes tables for creating a cluster. The attributes tables include a VLAN table, a volume table, a vIO table, a port profile, a zoning table, and a LUN masking table.

FIG. 9 illustrates a VLAN table (or VLAN information) 902 for Cluster-A. Once logical networks LNs are provided (e.g., inputted by an administrator), cluster management module 416 assigns a VLAN ID to each LN based on VLAN ID table 415*c* of inventory database 415 for SKU-01. Each LN is provided with a unique VLAN ID. Logical network MGMT is assigned VLAN ID of 10; logical network CLUSTER is assigned VLAND ID of 11; logical network MIGRATION is assigned VLAN ID of 12. VLAN table 902 of inventory database 415 holds VLAN ID list which can be used for SKU-01. When a specific VLAN ID is consumed by a given LN, that VLAN ID cannot be used even after the VLAN ID is released from the LN. In the present embodiment, VLAN table 902 includes other types of LNs (e.g., DMZ01, DMZ02, Int-LAN01) that will be used to service LAN of a virtual machine. These LNs are assigned dedicated VLAN IDs as well.

FIG. 10 illustrates a volume table 1000 for Cluster-A. Volume table 1000 includes an array ID 1012, a port ID 1014, a volume ID 1016, a storage capacity 1018, and a pool 1020 where the volume comes from. After an administrator provides storage array ports and storage capacity, cluster management module 416 reserves resources from storage array 300 by accessing inventory database 415. Once cluster management module 416 finds sufficient resources, it creates volume table 1000 for that specific cluster. These attributes are used subsequently to configure a storage array.

FIG. 11 illustrates a virtual I/O (vIO) table 1100 for Cluster-A. Access to the resources of storage system 90 for each host is controlled using vIO table (or vIO information) 1100. Once an administrator inputs a maximum number of hosts for the cluster, cluster management module 416 defines the same number of vIO as the maximum number of hosts. vIO table 1100 includes a vIO ID 1102, a virtual LAN address 1104, a virtual SAN address 1106, and a status section 1108. In the present embodiment, vIO table 1100 includes a virtual LAN address and a virtual SAN address to provide a cluster in a virtual machine environment.

One advantage of using a virtual SAN address is a simplified failover procedure. For example, if storage array 300 or its port experiences a failure, the virtual SAN address (WWPN) assigned vIO device can failover to another storage port simply by migrating the virtual SAN address to another storage port. The existing cluster definition table, accordingly, can be used with minimal administrative burden.

Referring to FIG. 11, each vIO has the same number of virtual MAC addresses for LAN access as the number of LNs, and at least one virtual WWPN address for SAN access. MAC address and WWPN address for the vIO table are consumed from inventory database 415. Status section 1108 indicates whether vIO are assigned or not assigned to any host. CLUS-A01, CLUS-A02, CLUS-A03, and CLUS-A04 are assigned to host 100-1, host 100-2, host 100-4, and host 100-5, respectively. CLUS-A05 to CLUS-A08 are unassigned and available for allocation to hosts that are subsequently added to the cluster.

FIG. 12a illustrates a port profile 1200 for Cluster-A. Port profile 1200 is used to configure a switch, e.g., a switch provided for LAN fabric 600a. Port profile 1200 includes one or more VLAN ID, and one or more MAC address. Port profile 1200 is associated with the logical network MGMT. According to port profile 1200, when an end node (such as host 100) sends a frame with a MAC address (e.g., "12-34-56-78-9a-bc"), this frame will be handled as the frame with the specific VLAN ID ("10"). Since cluster-A has vIOs CLUS-A01~CLUS-A08 (see FIG. 11), each port profile has the MAC address of the vIO.

FIG. 12b illustrates a port profile 1202 that is associated with the logical network CLUSTER. FIG. 12c illustrates a port profile 1204 that is associated with the logical network MIGRATION. In an embodiment, EVB VDP (Edge Virtual Bridging, Virtual Station Interface Discovery and Configuration Protocol) or MAC based VLAN may be used to execute a similar functionality. The technology implemented may vary according to the technology supported by switches in the SKU.

FIG. 13 illustrates a zoning table 1300 for Cluster-A. Zoning table 1300 is used to configure a switch for a Fibre Channel zoning setup. Zoning restricts access based on the request initiator's WWPN and the target's WWPN. Cluster management module 416 creates zoning table 1300 for Cluster-A by referring to volume table 1000 and vIO table 1100. Zoning table 1300 includes WWPNs of targets (storage array) and WWPNs of initiators (hosts). WWPNs of targets may be obtained from volume table 1000, and WWPNs of initiators may be obtained from VIF table 1100. Zoning table 1300 may include physical addresses and virtual addresses.

Figure 14:
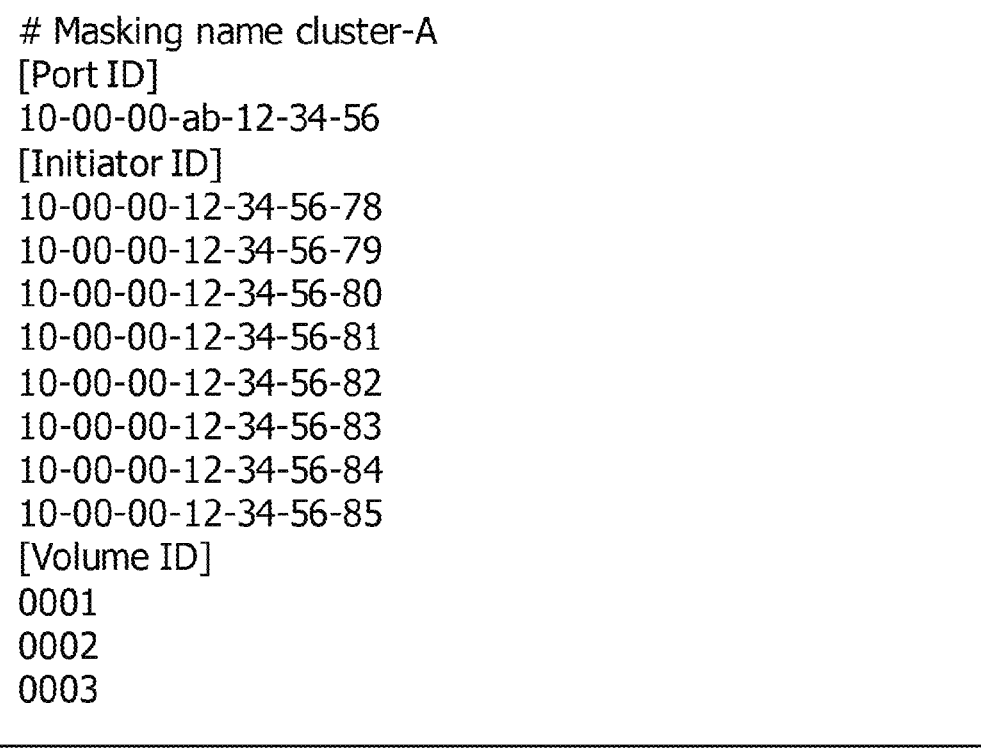
FIG. 14 illustrates a LUN masking table for a cluster.

FIG. 14 illustrates a LUN masking table 1400 for Cluster-A. LUN masking 1400 is a feature in storage array 300 for restricting storage I/O access of a specific LU only to authorized initiators. LUN masking table 1400 includes a port ID that may be virtual or physical address according to implementation. LUN masking table 1400 also includes initiator IDs and volume IDs. Typically, the LUN masking table uses the address of a request initiator to determine its access privilege to certain storage volumes.

LUN masking table 1400 provides additional security to zoning mechanism. LUN masking controls what LUs an initiator can see for a particular storage array port. If zoning is used only, an unauthorized initiator can see all LUs on a target port although they cannot actually access the data stored therein. It is generally not desirable for unauthorized initiators to view LUs on a restricted target port. LUN masking table 1400 for Cluster-A may be generated by using volume table 1000 and vIO table 1100.

For other cluster definitions (e.g., Cluster-B or Cluster C) initiated by an administrator, cluster management module 416 creates a VLAN table, a volume table, a VIF table, a port profile, a zoning table, and a LUN masking table.

Figure 15:
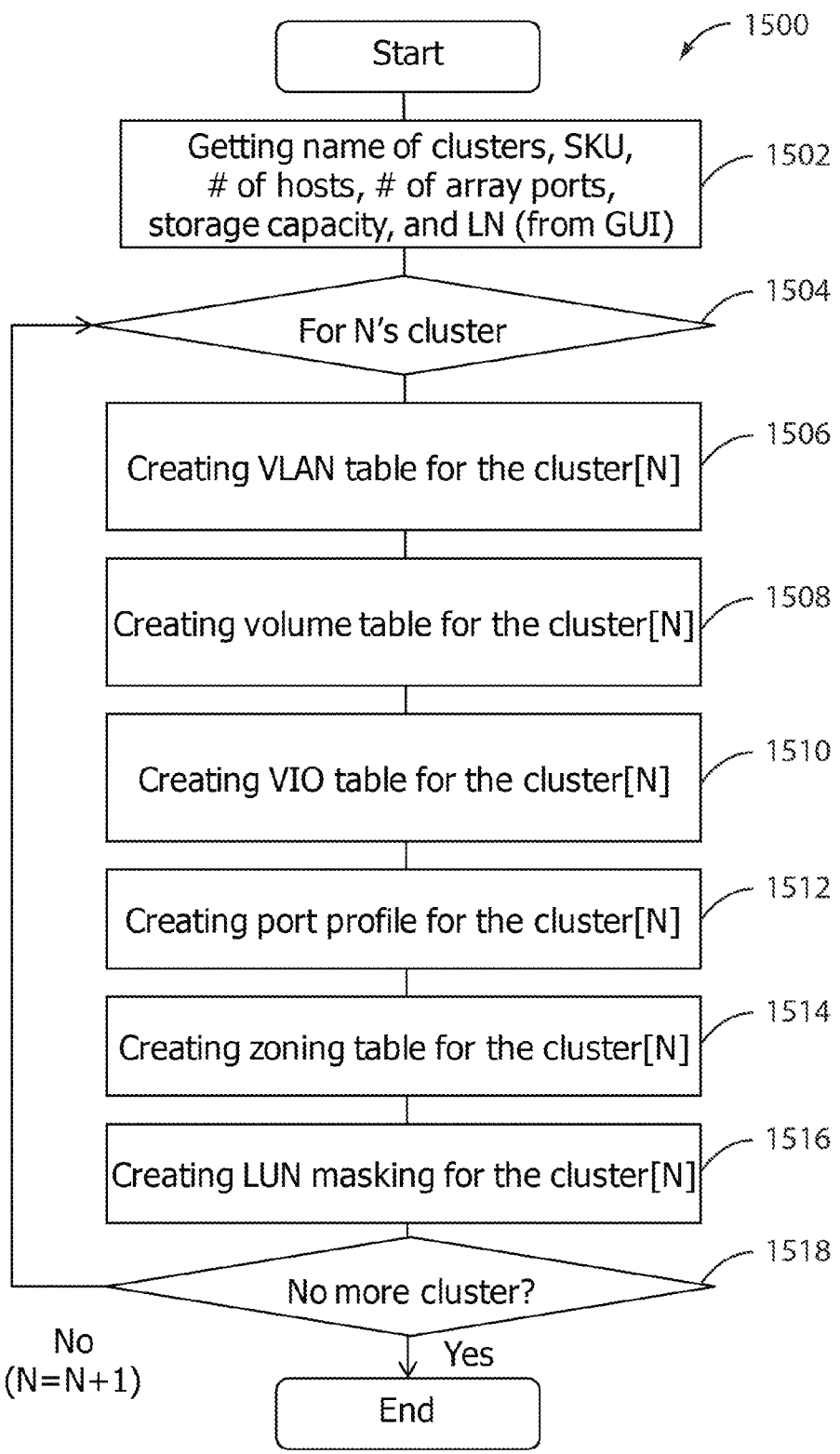
FIG. 15 illustrates a process for defining clusters.

FIG. 15 illustrates a process 1500 for defining clusters. Process 1500 summarizes the cluster definition process explained above in connection with FIGS. 7-14.

At step 1502, a GUI (e.g., GUI 800) provided by cluster management module 416 is used to select a scale unit SKU-01. The name of a cluster to be defined within SKU-01 is input. The maximum number of hosts and the maximum number of storage array ports for the cluster are input. A storage capacity for the cluster is set. One or more logical networks LNs are defined.

Once a desired number of clusters to be defined have been input, cluster management module 416 selects one of them for processing (step 1504). A VLAN table is created for the selected cluster (step 1506). For each logical network LN, cluster management module 416 assigns a VLAN ID using inventory database 415 of SKU-01. VLAN table 902 is an exemplary VLAN table created by step 1506. A volume table for the cluster is created using inventory database 415 (step 1508). Once information on storage array ports and storage capacity is provided, cluster management module 416 reserves resources from a storage array by accessing inventory database 415 to create the volume table. The volume table includes an array ID, a port ID, a volume ID, a storage capacity, and pool information.

A vIO table for the cluster is created (step 1510). If an administrator sets the maximum number of hosts for the cluster, cluster management module 416 defines the same number of vIOs as the maximum number of hosts. A vIO table includes a vIO ID, a virtual LAN address, a virtual SAN address, and a status section. MAC addresses and WWPN addresses for the vIO table are consumed from inventory database 415.

A port profile used to configure a switch is created for the cluster (step 1512). The port profile includes one or more VLAN ID, and one or more MAC address. A zoning table for the cluster is created (step 1514). Zoning restricts access based on WWPNs of the initiator and the target. The zoning table includes WWPNs of targets (or storage array) and WWPNs of initiators (hosts). A LUN masking table is created for the cluster (step 1516). LUN masking is used to control the access of a specific LU, e.g., to restrict what logical networks LNs an initiator may see for a storage array port.

Process 1500 determines is there is an additional cluster to be defined (step 1518). If so, process 1500 returns to step 1504 to select the next cluster to be defined and continues steps 1506 to 1516. Process 1500 ends if there is no more cluster to be defined.

Once the desired cluster definition tables have been created (e.g., by creating VLAN tables, volume tables, VIF tables, port profiles, zoning tables, and LUN masking tables), these could be used to configure the storage array and the switches and create the clusters. For example, an administrator, e.g., a storage administrator, may set up a storage array 300 using volume table 1000 and LUN masking 1400 for each cluster. Alternatively, storage array management module 413 may be used to set up storage array 300 using volume table 1000 and LUN masking 1400.

An administrator such as a network administrator may configure switch 200 associated with LAN fabric 600a by using port profile 1200. Alternatively, switch management module 511 could also configure switch 200 of LAN fabric 600a by using port profile 1200. Similarly, a network administrator could configure switch 200 associated with SAN fabric 600b by using zoning table 1300. Alternatively, switch management module 511 could configure the switch using zoning table 1300.

Once storage array 300 and the switch have been configured, clusters can be created in storage system 90. To create a cluster, an administrator selects the hosts for the cluster. After selecting the hosts, cluster management module 416 assigns vIO devices to the hosts. Cluster manager module 416 assigns MAC addresses of the vIO to LAN ports in the hosts, and assigns WWPN addresses of the vIO to SAN ports in the hosts. Additionally, cluster management module 416 may assign IP addresses to LAN ports (for the MAC address) in the hosts. IP address may be consumed from inventory database 415 or assigned by DHCP.

Figure 16:
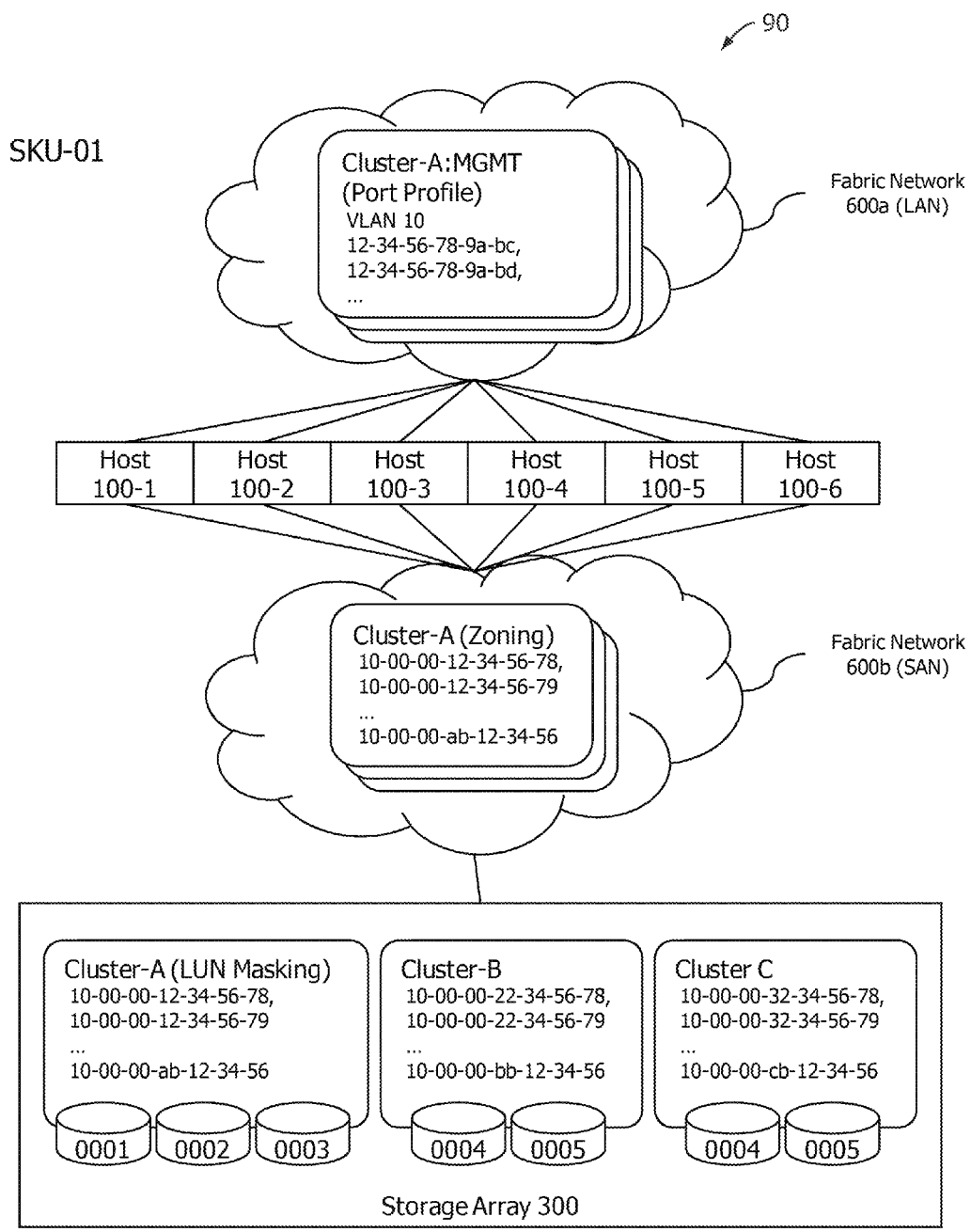
FIG. 16 illustrates a scale unit in a storage system after creating cluster definition tables, configuring switches and configuring a storage array.

FIG. 16 illustrates a scale unit SKU-01 in storage system 90 after creating cluster definition tables, configuring switches and configuring a storage array. Storage system 90 includes a fabric network 600 including a LAN fabric 600a defined using port profiles and a SAN fabric 600b defined a zoning table. A plurality of hosts 100 (or servers) is provided logically between LAN fabric 600a and SAN fabric 600b. A storage array 300 having a plurality of logical storage volumes is coupled to SAN fabric 600b.

Figure 17:
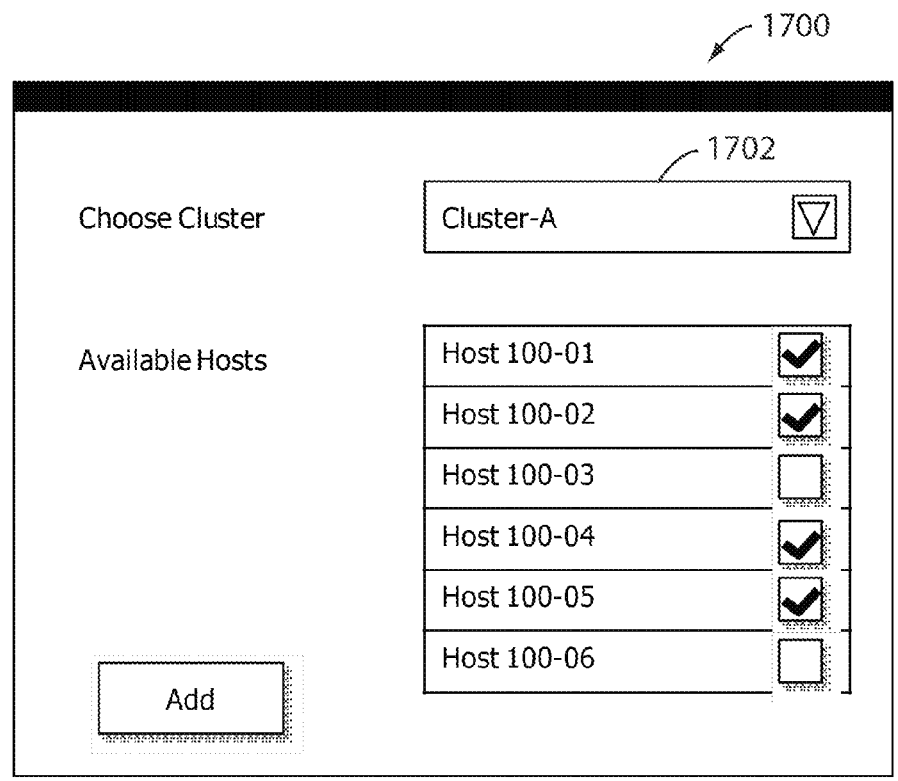
FIG. 17 illustrates a GUI for adding a host to a cluster.

FIG. 17 illustrates a GUI 1700 for adding a host to a cluster. A desired cluster (e.g., Cluster-A) is selected using a cluster selector 1702. GUI 1700 lists hosts that are available for Cluster-A so that an administrator can select the desired hosts for Cluster-A. GUI 1700 populates the available hosts for Cluster-A using inventory database 415. The hosts are selected by checking the boxes next to the desired hosts. Hosts 100-01, 100-02, 100-04 and 100-05 are selected to be joined to Cluster-A in GUI 1700. Once a host is selected and consumed by a cluster, that host is no longer available and will not appear in GUI 1700 subsequently unless that host is released from the cluster. In a SKU, every host can connect to each other, and every host can connect to the same storage array in an implementation.

With the virtual addresses such as MAC address and WWPN address, the hosts selected for the cluster could have the same VLAN connection and could connect to the same volumes to create a cluster system for virtual machine environment (or virtual cluster). In this case, cluster management module 416 assigns vIOs addresses to hosts 100-1, 100-2, 100-3 and 100-4, as shown in vIO table 1100. Each of hosts 100-1, 100-2, 100-3 and 100-4 that is paired with CLUS-A01, A02, A03 and A04, respectively, is assigned with three virtual MAC addresses and one virtual WWPN. These hosts could access VLAN ID 10, 11, and 12, and access the volume ID 0001, 0002 and 0003 on storage array 300. These hosts then become ready for cluster configuration. Additionally, the status information of vIO table 1100 could be used for re-assigning vIO after host rebooting.

Figure 18:
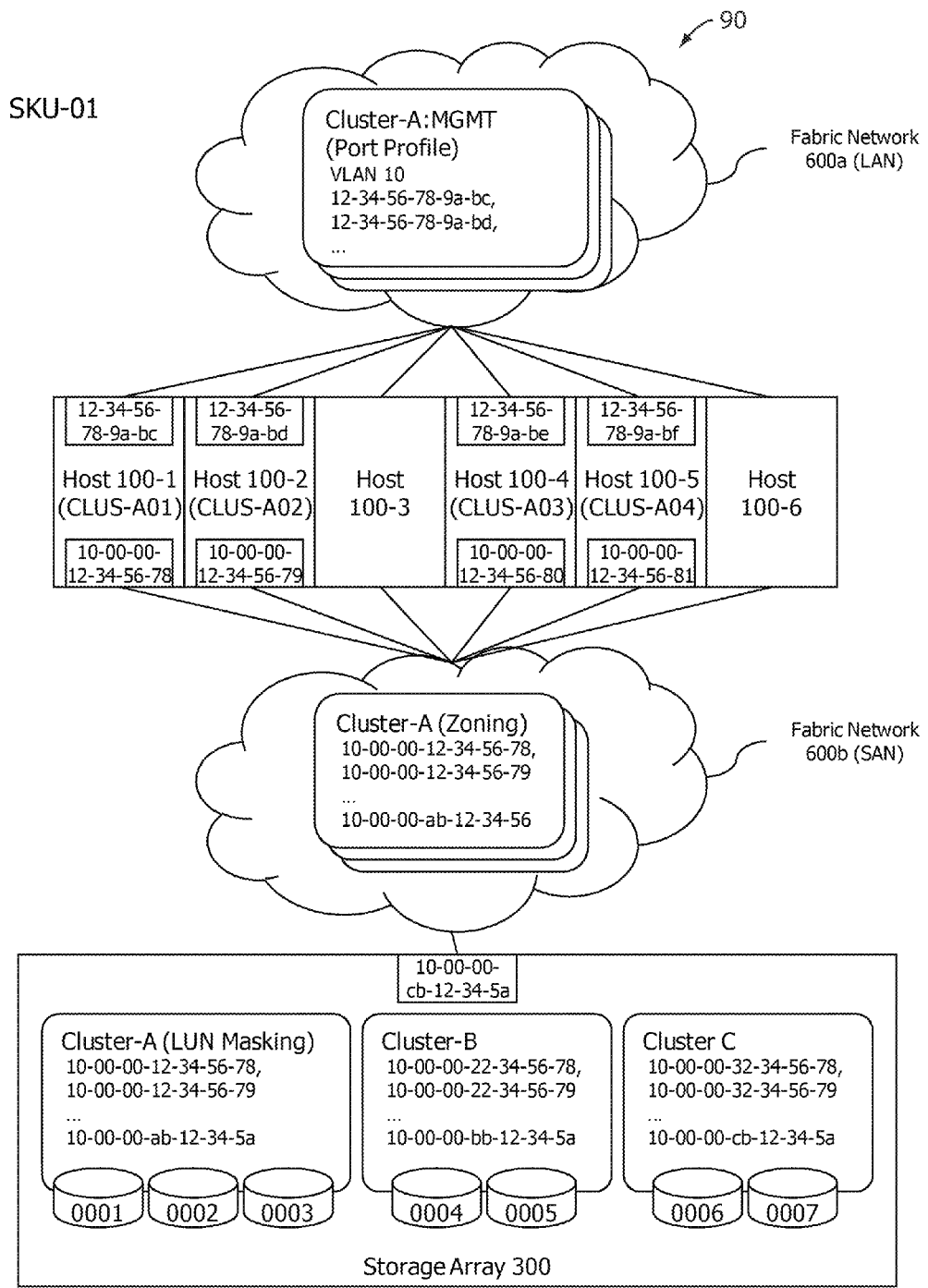
FIG. 18 illustrates scale unit after assigning vIO devices to the hosts that are selected using a GUI.

FIG. 18 illustrates scale unit SKU-01 after assigning vIO devices to the hosts that are selected using GUI 1700. Cluster management module 416 picks up unused vIOs and assigns them to the selected hosts once the hosts are selected using GUI 1700. For example, hosts 100-1, 100-2, 100-4, and 100-5 are assigned virtual LAN addresses (MAC addresses) and virtual SAN addresses (WWPN). Hosts 100-3 and 100-6 that are not selected are not assigned any vIO devices. A virtual SAN address (e.g., 10-00-00-cb-12-34-5a) is assigned to a port of storage array 300. Cluster management module 416 updates status section 1108 of vIO table 1100 after the vIO assignment.

Figure 19:
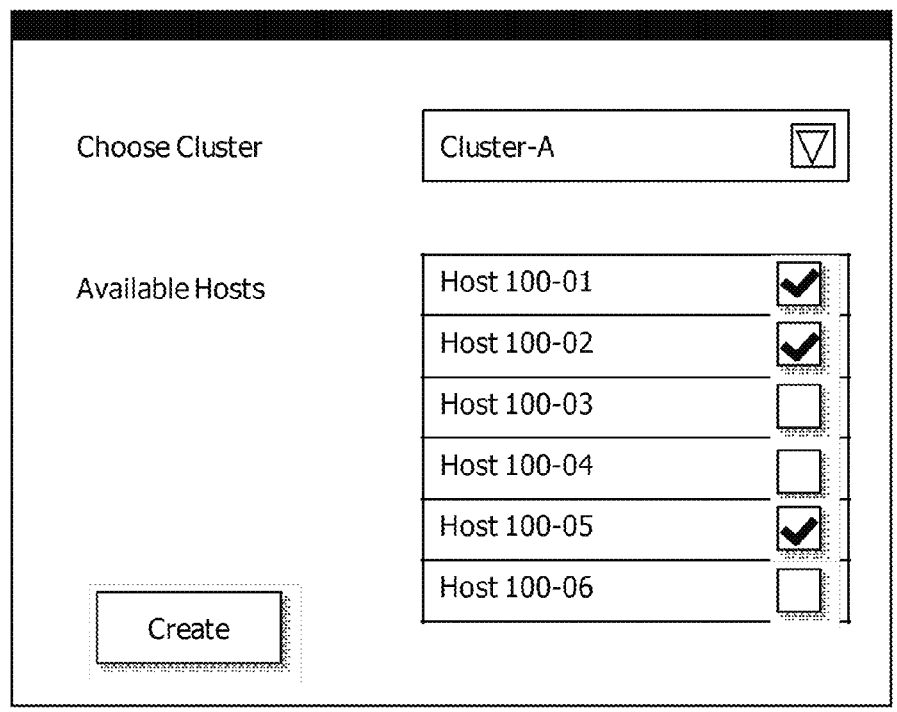
FIG. 19 illustrates a GUI used to release a host from a cluster.
Figure 20:
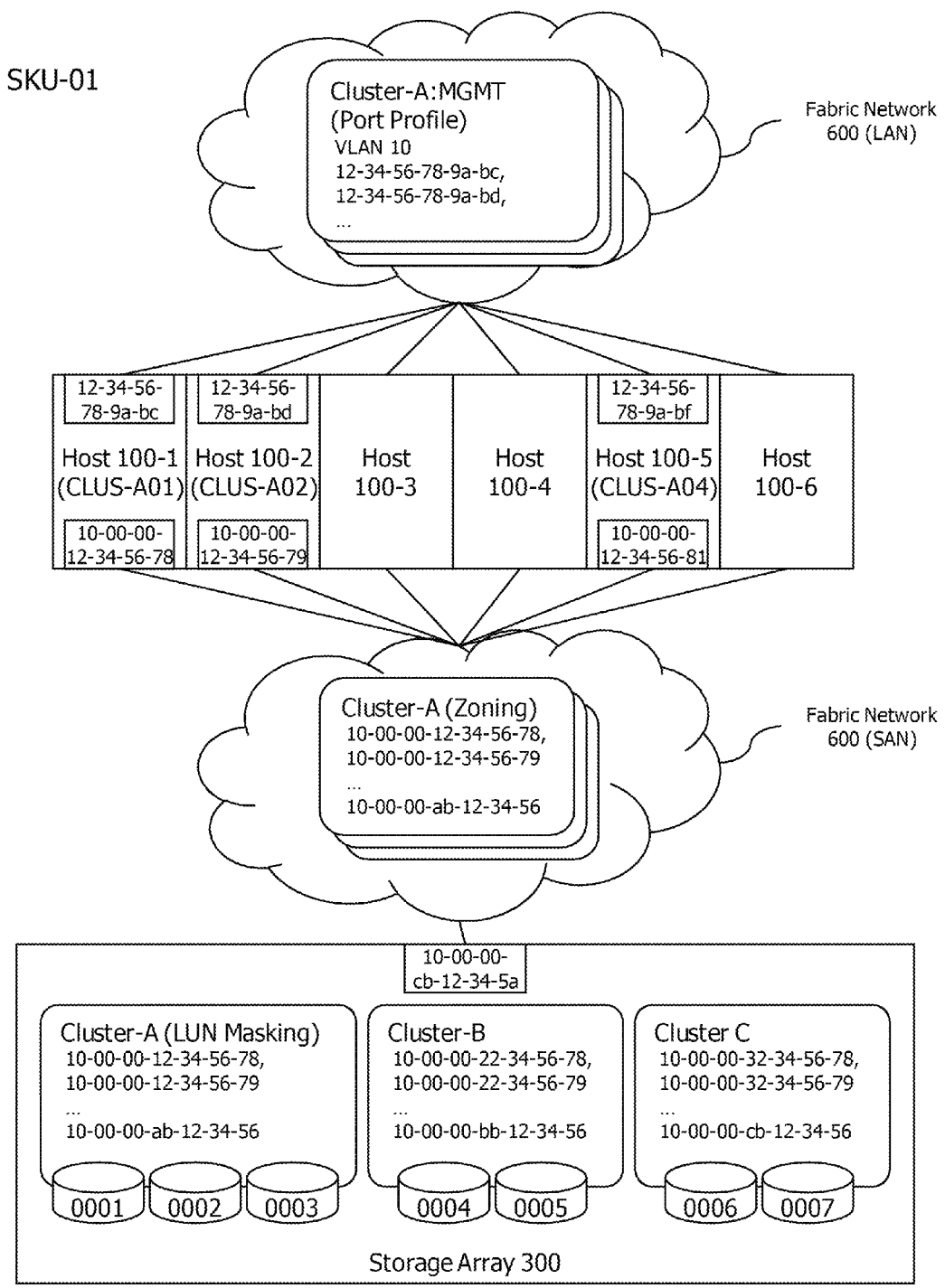
FIG. 20 illustrates a scale unit in a storage system after vIO addresses (MAC addresses and WWPN) are from a host.

FIG. 19 illustrates a GUI 1900 used to release a host from a cluster. An administrator can release host 100-4 from Cluster-A by unchecking a box next to host 100-4 to initiate the host release. Cluster management module 416 deletes vIO addresses (MAC addresses and WWPN) from the host shown as in FIG. 20 and updates status section 1108 of vIO table 1100 for the cluster. The released host 100-4 can be reassigned subsequently to another cluster.

Figure 21:
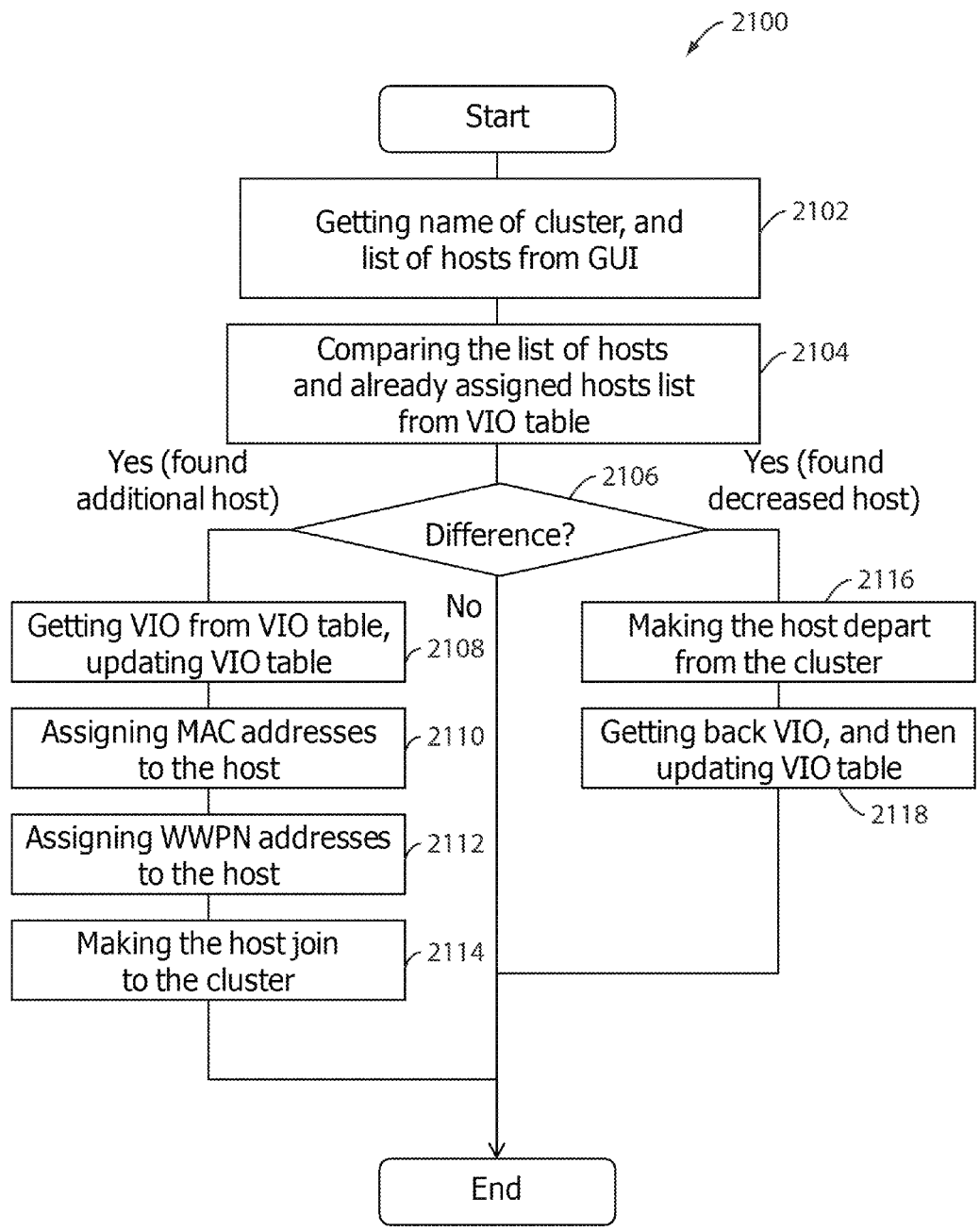
FIG. 21 illustrates a process for adding or deleting a host from a cluster.

FIG. 21 illustrates a process 2100 for adding or deleting a host from a cluster. At step 2102, a GUI (e.g., GUI 1700) is initiated to choose a cluster. Once a cluster is selected, the hosts that are available for the cluster are displayed by the GUI. The hosts displayed include those assigned to the cluster and those that are free to be assigned to the cluster.

At step 2104, an administrator may add a host to the cluster by checking a box next to a free host or deleting a host from the cluster by unchecking a box next to an assigned host. A comparison is made between the marks checked next to the hosts displayed and status section 1108 of vIO table 1100. A determination is made whether or not there is difference between the marked checked in the GUI and status section 1108 (step 2106). If there is no difference, process 2100 ends.

If a difference is found, a host is added or deleted depending on the difference. If the difference is that one or more additional hosts are checked in GUI 1700, process 2100 proceeds to step 2108 to add the hosts. vIO information is obtained from vIO table 1100 and status section 1108 is updated. Virtual MAC addresses obtained from vIO table 1100 are assigned to the selected host (step 2110). Virtual WWPN address obtained from vIO table 1100 is assigned to the selected host (step 2112). The selected host is then joined to the cluster (step 2114).

If the difference is that one or more previously assigned hosts are unchecked in GUI 1700, process 2100 proceeds to step 2116 and detaches the hosts from the cluster. Status section 1108 of vIO table 1100 is updated to indicate the detachment of the host (step 2118).

FIGS. 24a-24f show examples of host, storage array, VLAN ID, IP address, MAC address and WWPN address tables in inventory database 415. Cluster management module 416 manages the status of each resource. Unused resources can be assigned to a cluster.

The preceding has been a description of the preferred embodiment of the invention. It will be appreciated that deviations and modifications can be made without departing from the scope of the invention, which is defined by the appended claims.

What is claimed is:

1. A method for provisioning a cluster system in a virtual machine environment in a storage system, the storage system having a plurality of hosts, a storage array, and a management server, the method comprising:
provioding an inventory database including resource information, the resource information having a virtual computer network address and a virtual storage network address;
creating a virtual I/O ("vIO") information, the vIO information associating a vIO device with at least one virtual computer network address and at least one virtual storage network address, the virtual computer network address and the virtual storage network address being selected from the inventory database;
providing cluster information for a cluster in a plurality of clusters, the cluster information associating the vIO information with volume information of a storage array;
in advance of assigning the vIO device to one of selected hosts:
defining a virtual computer network for the cluster, including configuring a first switch according to the virtual computer network address of the vIO information,
defining a virtual storage network for the cluster, including configuring a second switch according to the virtual storage network address of the vIO information, and
configuring the storage array according to the volume information;
accepting a selection of the cluster from the plurality of clusters;
accepting a selection of hosts in the plurality of hosts; and
creating a first cluster system based on the selected cluster and the selected hosts, including assigning the vIO device to the one of the selected hosts using the vIO information associated with the selected cluster, wherein the one of the selected hosts communicates using the virtual computer network address associated with the vIO device, and communicates with the storage array using the virtual storage network address associated with the vIO device.

2. The method of claim 1, wherein the virtual computer network address is a virtual LAN address, the virtual storage network address is a virtual SAN address, and the inventory database is provided in the management server.

3. The method of claim 2, further comprising:
providing a virtual LAN ("VLAN") information including a logical network name and a VLAN ID;
providing the volume information, the volume information including a storage array ID, a port ID, and a volume ID; and
creating a first cluster definition associated with the first cluster system is created using the vIO information, the VLAN information, and the volume information,
wherein the virtual LAN address is a virtual Media Access Control (MAC) address, and the virtual SAN address is a World Wide Port Name (WWPN).

4. The method of claim 3, further comprising:
generating a port profile for the first cluster system, the port profile having mapping information between the MAC address and the VLAN ID;
generating a zoning information for the first cluster system; and
generating logical unit number (LUN) masking for the first cluster system,
wherein the first cluster definition is created using the vIO information, the VLAN information, the volume information, the port profile, the zoning information, and the LUN masking.

5. The method of claim 1, further comprising storing a first cluster definition associated with the first cluster system in the management server.

6. The method of claim 5, wherein the management server includes a cluster database and an inventory database.

7. The method of claim 6, wherein the virtual computer network address is a virtual LAN address and the virtual storage network address is a virtual SAN address, wherein the first cluster definition is stored in the management server, the management server having a plurality of cluster definitions stored therein, the method further comprising:
selecting a second cluster definition from the plurality of cluster definitions stored in the management server;
selecting a host to be added to the second cluster definition;
updating the vIO information based upon the host selected to be added to the second cluster definition;
assigning the virtual LAN address and the virtual SAN address to the host selected to be added to the second cluster definition;
joining the host selected to be added to the second cluster definition to a second cluster system.

8. The method of claim 6, wherein the virtual computer network address is a virtual LAN address and the virtual storage network address is a virtual SAN address, wherein the first cluster definition is stored in the management server, the management server having a plurality of cluster definitions stored therein, the method further comprising:
selecting a second cluster definition from the plurality of cluster definitions stored in the management server;
selecting a host to be deleted from the second cluster definition;
causing the host selected to be deleted to be detached from a second cluster system; and
updating the vIO information based upon the host selected to be deleted from the second cluster definition.

9. A management server of a storage system having a plurality of hosts, and a storage array, the management server being configured for provisioning of a cluster system in a virtual machine environment of the storage system, the management server comprising:
a processor configured to process data;
a memory configured to store information;
a port configured for communication with the storage array; and
a cluster management module configured to:
access an inventory database including resource information, the resource information having a virtual computer network address and a virtual storage network address;
create a virtual I/O ("vIO") information, the vIO information associating a vIO device with at least one virtual computer network address and at least one virtual storage network address, the virtual computer network address and the virtual storage network address being selected from the inventory database;
provide cluster information for a cluster in a plurality of clusters, the cluster information associating the vIO information with volume information of a storage array;
in advance of assigning the vIO device to one of selected hosts:

define a virtual computer network for the cluster, including configuring a first switch according to the virtual computer network address of the vIO information, define a virtual storage network for the cluster, including configuring a second switch according to the virtual storage network address of the vIO information, and configure the storage array according to the volume information;

accept a selection of the cluster from the plurality of clusters;

accept a selection of hosts in the plurality of hosts; and create a first cluster system based on the selected cluster and the selected hosts, including assigning the vIO device to the one of the selected hosts using the vIO information associated with the selected cluster, wherein the one of the selected hosts communicates using the virtual computer network address associated with the vIO device, and communicates with the storage array using the virtual storage network address associated with the vIO device.

10. The management server of claim 9, wherein the virtual computer network address is a virtual LAN address, the virtual storage network address is a virtual SAN address, and the inventory database is provided in the management server.

11. The management server of claim 10, further including the cluster management module configured to:

provide a virtual LAN ("VLAN") information including a logical network name and a VLAN ID; and provide the volume information, the volume information including a storage array ID, a port ID, and a volume ID, wherein a first cluster definition associated with the first cluster system is created using the vIO information, the VLAN information, and the volume information, and wherein the virtual LAN address is a virtual Media Access Control (MAC) address, and the virtual SAN address is a World Wide Port Name (WWPN).

12. The management server of claim 11, further including the cluster management module configured to:

generate a port profile for the first cluster system, the port profile having mapping information between the MAC address and the VLAN ID;

generate a zoning information for the first cluster system; and generate logical unit number (LUN) masking for the first cluster system, wherein the first cluster definition is created using the vIO information, the VLAN information, the volume information, the port profile, the zoning information, and the LUN masking.

13. The management server of claim 9, wherein the server is a system management server provided in the storage system and includes a cluster database, and the inventory database.

14. The management server of claim 13, wherein the virtual computer network address is a virtual Media Access Control (MAC) address, and the virtual storage network address is a World Wide Port Name (WWPN), wherein the first cluster definition is stored in the management server, the management server having a plurality of cluster definitions stored therein, further including the cluster management module configured to:

select a second cluster definition from the plurality of cluster definitions stored in the management server based upon a first input from an administrator;

select a host to be added to the second cluster definition based upon a second input from the administrator;

update the vIO information based upon the host selected to be added to the second cluster definition;

assign the virtual MAC address and the WWPN to the host selected to be added to the second cluster definition; and cause the host selected to be added to the second cluster definition to be joined to a second cluster system.

15. The management server of claim 13, wherein the virtual computer network address is a virtual Media Access Control (MAC) address, and the virtual storage network address is a World Wide Port Name (WWPN), wherein the first cluster definition is stored in the management server, the manager server having a plurality of cluster definitions stored therein, further including the cluster management module configured to:

select a second cluster definition from the plurality of cluster definitions stored in the management server based upon a first input from an administrator;

select a host to be deleted from the second cluster definition based upon a second input from the administrator;

cause the host selected to be deleted to be detached from a second cluster system; and update the vIO information based upon the host selected to be deleted from the second cluster definition.

16. A storage system, comprising:

a storage array including a plurality of hard disk drives and coupled to a host; and a management server configured to managed the storage array and having a processor, a memory, a non-transitory computer readable medium, and a port, wherein the management server is configured for provisioning a cluster system in a virtual machine environment of the storage system, and wherein the non-transitory computer readable medium comprises:

code to access an inventory database including resource information, the resource information having a virtual computer network address and a virtual storage network address, code to create a virtual I/O ("vIO") information, the vIO information associating a vIO device with the virtual computer network address and the virtual storage network address, the virtual computer network address and the virtual storage network address being selected from the inventory database, code to provide cluster information for a cluster in a plurality of clusters, the cluster information associating the vIO information with volume information of a storage array;

code to, in advance of assigning the vIO device to one of selected hosts:

define a virtual computer network for the cluster, including code to configure a first switch according to the virtual computer network address of the vIO information, define a virtual storage network for the cluster, including code to configure a second switch according to the virtual storage network address of the vIO information, and configure the storage array according to the volume information;

code to accept a selection of the cluster from the plurality of clusters;

code to accept a selection of hosts in the plurality of hosts; and code to create a first cluster system based on the selected cluster and the selected hosts by assigning the vIO device to the one of the selected hosts using the vIO information, wherein the one of the selected hosts communicates using the virtual computer network address associated with the vIO device, and communicates with the storage array using the at least one virtual storage network address associated with the vIO device.

17. The storage system of claim 16, wherein the management server includes a cluster database and an inventory database, and the virtual computer network address is a virtual Media Access Control (MAC) address, and the virtual storage network address is a World Wide Port Name (WWPN).

* * * * *